US011290205B2

United States Patent
Tang (10) Patent No.: US 11,290,205 B2
(45) Date of Patent: Mar. 29, 2022

(54) WIRELESS COMMUNICATION METHOD FOR IMPLEMENTING CSI FEEDBACK AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/549,357

(22) Filed: Aug. 23, 2019

(65) Prior Publication Data

US 2019/0379483 A1 Dec. 12, 2019

Related U.S. Application Data

(63) Continuation of application No. PCT/CN2017/075242, filed on Feb. 28, 2017.

(51) Int. Cl.
*H04W 72/04* (2009.01)
*H04L 1/00* (2006.01)
(Continued)

(52) U.S. Cl.
CPC .......... *H04L 1/0026* (2013.01); *H04B 17/336* (2015.01); *H04L 5/0051* (2013.01); *H04W 72/0446* (2013.01)

(58) Field of Classification Search
CPC ... H04L 1/0026; H04L 5/0051; H04L 5/0023; H04L 5/0057; H04L 5/006; H04L 5/0091;
(Continued)

(56) References Cited

U.S. PATENT DOCUMENTS

2013/0258965 A1 10/2013 Geirhofer et al.
2015/0244444 A1* 8/2015 Mazzarese .......... H04B 7/0645
370/252
(Continued)

FOREIGN PATENT DOCUMENTS

CN 101911805 A 12/2010
CN 101917259 A 12/2010
(Continued)

OTHER PUBLICATIONS

Huawei, R1-1611236, Independent and joint control of CSI-RS transmission and CSI reporting for NR MIMO, Nov. 14-18, 2016 (Year: 2016).*

(Continued)

*Primary Examiner* — Hassan Kizou
*Assistant Examiner* — Mahbubul Bar Chowdhury (57) ABSTRACT

A wireless communication method, terminal device and network device, which can meet the communication performance requirements of 5G communication system. The method includes: the terminal device receives a trigger signaling sent by the network device, where the trigger signaling is used to activate an aperiodic channel state information reference signal CSI-RS resource of the terminal device; after receiving the trigger signaling, the terminal device performs the CSI measurement on aperiodic channel state information reference signal CSI-RS resource to obtain a first CSI; the terminal device determines the time domain resource for sending the first CSI the network device based on a timing relationship between sending the first CSI and receiving the trigger signaling or performing the CSI measurement; using the time domain resource, the terminal device sends the first CSI to the network device.

19 Claims, 5 Drawing Sheets

(51) Int. Cl.
*H04B 17/336* (2015.01)
*H04L 5/00* (2006.01)

(58) Field of Classification Search
CPC ... H04L 5/0048; H04L 5/0078; H04L 27/261; H04B 17/336; H04B 7/0456; H04W 72/0446; H04W 4/00; H04W 24/10

See application file for complete search history.

(56) References Cited

U.S. PATENT DOCUMENTS

| | | | |
|---|---|---|---|
| 2016/0197687 A1 | 7/2016 | Song et al. | |
| 2016/0278047 A1 | 9/2016 | Hoshino et al. | |
| 2016/0285535 A1 | 9/2016 | Kim et al. | |
| 2016/0359538 A1* | 12/2016 | Onggosanusi | H04L 5/0057 |
| 2018/0310305 A1* | 10/2018 | Shao | H04W 72/042 |
| 2019/0074883 A1* | 3/2019 | Park | H04B 7/0626 |
| 2019/0140723 A1* | 5/2019 | Yum | H04L 5/0057 |
| 2019/0165894 A1* | 5/2019 | Choi | H04L 5/0055 |
| 2019/0260430 A1* | 8/2019 | Cai | H04B 7/04 |
| 2019/0335475 A1* | 10/2019 | Liang | H04W 72/0413 |
| 2019/0349052 A1* | 11/2019 | Yum | H04W 24/10 |
| 2019/0364546 A1* | 11/2019 | Kwak | H04W 72/042 |
| 2019/0372642 A1* | 12/2019 | Kakishima | H04L 5/0048 |
| 2020/0036424 A1* | 1/2020 | Kang | H04W 72/04 |

FOREIGN PATENT DOCUMENTS

| | | |
|---|---|---|
| CN | 102412941 A | 4/2012 |
| CN | 103095419 A | 5/2013 |
| CN | 104038312 A | 9/2014 |
| CN | 104428998 A | 3/2015 |
| JP | 2016511564 A | 4/2016 |
| JP | 2018522474 A | 8/2018 |
| JP | 2020509655 A | 3/2020 |
| WO | 2014/071638 A1 | 5/2014 |
| WO | 2016204546 A1 | 12/2016 |
| WO | 2017/026863 A1 | 2/2017 |
| WO | 2018143665 A1 | 8/2018 |

OTHER PUBLICATIONS

Huawei, R1-1611241, DL CSI-RS design for NR CSI acquisition, Nov. 14-18, 2016 (Year: 2016).*
ZTE, R1-1611417, Beam selection and CSI acquisition for NR MIMO, Nov. 14-18, 2016 (Year: 2016).*
International Search Report dated Nov. 27, 2017; PCT/CN2017/075242.
R1 -1702455; Discussion on CSI framework for NR, published on Feb. 6, 2020.
R1-1701681; Independent and joint control of CSI-RS transmission and CSI reporting for NR MIMO, published on Feb. 7, 2020.
Second Office Action of corresponding Chinese application No. 201780086582.1, dated Jun. 29, 2020.
EESR of corresponding European application No. 17899106.3, dated Jun. 29, 2020.
LG Electronics Samsung Ericsson ZTE ZTE Microelectronics: "WF on timings for aperiodic CSI-RS and aperiodic CSI reporting", 3GPP Draft; R1 -1701356 WF on Aperiodic CSI_V5, 3rd Generation Partnership Project (3GPP), vol. RAN WG1, No. Spokane, USA; Jan. 16, 2017-Jan. 20, 2017 Jan. 19, 2017(Jan. 19, 2017), XP051222348.
Nokia Alcatel-Lucent Shanghai Bell: "Dynamic CSI-RS management", 3GPP Draft; R1-1612853, 3rd Generation Partnership Project (3GPP), vol. RAN WG1, No. Reno, USA; Nov. 14, 2016-Nov. 18, 2016 Nov. 13, 2016(Nov. 13, 2016), XP051176794.
Samsung:"LAA CSI reporting", 3GPP Draft; R1-156772_LAA CSI Reporting, 3rd Generation Partnership Project (3GPP), vol. RAN WG1, No. Anaheim, USA; Nov. 15, 2015-Nov. 22, 2015 Nov. 7, 2015(Nov. 7, 2015), XP051022496.
Partial Search Report of corresponding European application No. 17899106.3, dated Feb. 7, 2020.
Chinese First Examination Report of corresponding Chinese application No. 201780086582.1, dated Mar. 16, 2020.
ITRI: "On the CSI reporting for LAA", 3GPP Draft; R1-157086_Final, 3rd Generation Partnership Project (3GPP), Mobie Competence Centre; 650, Route Des Lucioles; F-06921 Sophia-Antipolis Cedex; France, vol. RAN WG1, No. Anaheim, USA; Nov. 15, 2015-Nov. 22, 2015 Nov. 15, 2015(Nov. 15, 2015), XP051003377.
Samsung: "Enhancement on Full-Dimension (FD) MIMO for LTE", 3GPP Draft; RP-160894_EFDMIMO Status Report, 3rd Generation Partnership Project (3GPP), Mobie Competence Centre; 650, Route Des Lucioles; F-06921 Sophia-Antipolis Cedex; France, vol. TSG RAN, No. Busan, Korea; Jun. 13, 2016-Jun. 16, 2016 Jun. 9, 2016(Jun. 9, 2016), XP051659464.
Samsung: "Elevation Beamforming/Full-Dimension (FD) MIMO for LTE", 3GPP Draft; RP-151845_FDMIMO Report, 3rd Generation Partnership Project (3GPP), Mobie Competence Centre; 650, Route Des Lucioles; F-06921 Sophia-Antipolis Cedex; France, vol. TSG RAN, No. Sitges, Spain; Dec. 7, 2015-Dec. 11, 2015 Dec. 5, 2015(Dec. 5, 2015), XP051655401.
Notice of Allowance of corresponding Chinese application No. 201780086582.1, dated Oct. 26, 2020.
First Office Action of corresponding European application No. 17899106.3, dated Jan. 22, 2021.
First Office Action of corresponding Japanese application No. 2019-546191, dated Feb. 9, 2021.
Xinwei, Further Discussion on CSI Framework Details[online], 3GPP TSG RAN WG1 #88 R1-1702023, Feb. 7, 2017, Internet<URL:http://www.3gpp.org/ftp/tsg_ran/WG1_RL1/TSGR1_88/Docs/R1-1702023.zip>.
Ericsson, On CSI Trigger and Timing[online], 3GPP TSG RAN WG1 #88 R1-1702682, Feb. 7, 2017 Internet<URL:http://www.3gpp.org/ftp/tsg_ran/WG1_RL1/TSGR1_88/Docs/R1-1702682.zip>.
Samsung, CSI measurement and reporting for processing time reduction[online], 3GPP TSG RAN WG1 #88 R1-1702881, Feb. 7, 2017, Internet<URL:http://www.3gpp.org/ftp/tsg_ran/WG1_RL1/TSGR1_88/Docs/R1-1702881.zip>.
First Office Action of corresponding Indian application No. 201917036638, dated Feb. 10, 2021.
First Office Action of corresponding Taiwan application No. 107104399, dated Aug. 6, 2021.
Samsung: "Enhancement on Full-Demension (FD) MIMO for LTE", 3GPP Draft; RP-161687, 3rd Generation Partnership Project (3GPP), Mobile Competence Centre; 650, Route Des Lucioles; F-06921 Sophia-Antipolis Cedex; France, vol. TSG RAN, No. New Orleans, USA; Sep. 10, 2016, XP051662241.
Second Office Action of corresponding European application No. 17899106.3, dated Sep. 29, 2021.
Subsequent Examination Report along with Hearing Notice of corresponding Indian application No. 201917036638, dated Oct. 21, 2021.

* cited by examiner

WIRELESS COMMUNICATION METHOD FOR IMPLEMENTING CSI FEEDBACK AND TERMINAL DEVICE

CROSS-REFERENCE TO RELATED APPLICATIONS

This application is a continuation of International Application No. PCT/CN2017/075242, filed on Feb. 28, 2017, the content of which is incorporated herein by reference in its entirety.

TECHNICAL FIELD

The present disclosure relates to the field of communications, and more particularly, relates to a wireless communication method, terminal device, and network device.

BACKGROUND

In a Long Term Evolution (LTE) communication system, a terminal device performs a measurement on a Channel State Information Reference Signal (CSI-RS) sent by a network device to obtain channel state information (CSI). At present, the discussion of 5G communication system is underway. In the 5G communication system, how to implement CSI feedback to meet the communication performance requirements of 5G communication system is an urgent problem to be solved.

SUMMARY

The embodiment of the present disclosure provides a wireless communication method, terminal device, network device, which can meet the communication performance requirements of the 5G communication system.

A first aspect provides a wireless communication method, including:

receiving, by a terminal device, a trigger signaling sent by a network device, where the trigger signaling is used to activate an aperiodic channel state information reference signal CSI-RS resource of the terminal device;

after receiving the trigger signaling, performing, by the terminal device, CSI measurement on the aperiodic channel state information reference signal CSI-RS resource to obtain a first CSI;

determining, by the terminal device, a time domain resource for sending the first CSI to the network device based on a timing relationship between sending the first CSI and receiving the trigger signaling or performing the CSI measurement;

sending, by the terminal device, the first CSI to the network device using the time domain resource.

In combination with the first aspect, in a possible implementation of the first aspect, the first CSI includes at least one of following contents:

a CSI-RS resource indicator CRI, a rank indication RI, a pre-coding matrix indicator PMI, a channel quality information CQI, a quantized value of channel information and a quantized value of interference.

In combination with the first aspect or any of the above possible implementations thereof, in another possible implementation of the first aspect, the performing, by the terminal device, CSI measurement on the aperiodic CSI-RS resource to obtain a first CSI, includes:

determining, by the terminal device, at least one of following according to the content included in the first CSI, and performing, by the terminal device, the CSI measurement according to at least one of the following to obtain the first CSI:

resource and/or configuration of the aperiodic CSI-RS resource, number of CSI-RS ports used for performing CSI-RS measurement, and hypothesis of the transmit beam of the CSI-RS signal on the aperiodic CSI-RS resource.

In combination with the first aspect or any of the above possible implementations thereof, in another possible implementation of the first aspect, before the determining, by the terminal device, a time domain resource for sending the first CSI to the network device based on a timing relationship between sending the first CSI and receiving the trigger signaling or performing the CSI measurement, the method also includes:

determining the timing relationship according to content included in the first CSI.

In combination with the first aspect or any of the above possible implementations thereof, in another possible implementation of the first aspect, the triggering signaling includes first information, where the first information is used to indicate content included in the first CSI;

the performing, by the terminal device, CSI measurement on the aperiodic CSI-RS resource, includes:

performing, by the terminal device, the CSI measurement on the first CSI-RS resource according to the first information to obtain the first CSI, where, the first CSI includes the content indicated in the first information.

In combination with the first aspect or any of the above possible implementations thereof, in another possible implementation of the first aspect, the first information is used to indicate one of following contents:

a CRI; or
a RI, a PMI and a CQI; or
a CRI, a RI, a PMI and a CQI; or
a RI and a CQI; or
a CRI, a RI and a CQI.

In combination with the first aspect or any of the above possible implementations thereof, in another possible implementation of the first aspect, the trigger signaling includes second information, where the second information is configuration information of a timing relationship;

before the determining, by the terminal device, a time domain resource for sending the first CSI to the network device based on a timing relationship between sending the first CSI and receiving the trigger signaling or performing the CSI measurement, the method also includes:

determining the timing relationship between sending the first CSI and receiving the trigger signaling or performing the CSI measurement according to the configuration information of the timing relationship.

In combination with the first aspect or any of the above possible implementations thereof, in another possible implementation of the first aspect, sending, by the terminal device, the first CSI to the network device, includes:

sending the first CSI to the network device multiple times.

In combination with the first aspect or any of the above possible implementations thereof, in another possible implementation of the first aspect, the triggering signaling includes third information, the third information is used to indicate the number of times that the terminal device sends the first CSI;

the sending, by the terminal device, the first CSI to the network device, includes: sending, by the terminal device, the first CSI according to the number of transmission indicated by the third information.

In combination with the first aspect or any of the above possible implementations thereof, in another possible implementation of the first aspect, the measurement configuration information corresponding to the first CSI sent each time is different from that corresponding to the first CSI sent by other times.

In combination with the first aspect or any of the above possible implementations thereof, in another possible implementation of the first aspect, before the performing, by the terminal device, CSI measurement on the aperiodic CSI-RS resource to obtain a first CSI, the method also includes:

determining, by the terminal device, the most recent resource after receiving the trigger signaling as the aperiodic CSI-RS resource from a resource used for aperiodic CSI-RS transmission.

In combination with the first aspect or any of the above possible implementations thereof, in another possible implementation of the first aspect, the method also includes:

after receiving the trigger signaling, determining a first interference measurement resource IMR;

performing interference measurement on the first IMR resource to obtain an interference result;

obtaining the first CSI by combining the interference result and the result obtained by performing the CSI measurement.

In combination with the first aspect or any of the above possible implementations thereof, in another possible implementation of the first aspect, the determining a first interference measurement resource, includes:

determining, by the terminal device, the most recent resource after receiving the trigger signaling as the first IMR resource from an IMR resource used for aperiodic interference measurement.

In combination with the first aspect or any of the above possible implementations thereof, in another possible implementation of the first aspect, the trigger signaling is downlink control information DCI signaling or media access control MAC signaling.

A second aspect provides a wireless communication method, including:

sending, by a network device, a trigger signaling to a terminal device, where the trigger signaling is used to activate an aperiodic channel state information reference signal CSI-RS resource of the terminal device;

determining, by the network device, a time domain resource for receiving the first CSI based on a timing relationship between receiving the first CSI and sending the trigger signaling;

receiving the first CSI that is sent by the terminal device using the time domain resource.

In combination with the second aspect, in a possible implementation of the second aspect, the first CSI includes at least one of following contents:

a CSI-RS resource indicator CRI, a rank indication RI, a pre-coding matrix indicator PMI, a channel quality indication CQI, a quantized value of channel information and a quantized value of interference.

In combination with the second aspect or any of the above possible implementations thereof, in another possible implementation of the second aspect, the method also includes:

when the first CSI includes CRI, obtaining beam information of downlink beamforming used for downlink scheduling according to the CRI; or, when the first CSI includes the rank indication RI, the pre-coding matrix indicator PMI and the channel quality indication CQI, performing downlink data scheduling on the terminal device according to the RI, the PMI, and the CQI; or, when the first CSI includes the rank indication RI and the channel quality indication CQI, performing downlink data scheduling on the terminal device according to the RI and the CQI.

In combination with the second aspect or any of the above possible implementations thereof, in another possible implementation of the second aspect, the trigger signaling includes at least one of first information, second information and third information, wherein, the first information is used to indicate content included in the first CSI;

the second information is configuration information of a timing relationship, and is used by the terminal device to determine the timing relationship according to the configuration information of the timing relationship;

the third information is used to indicate the number of times that the terminal device sends the first CSI.

A third aspect provides a terminal device, the terminal device may include a unit for implementing the method in the above first aspect or any of possible implementations thereof.

A fourth aspect provides a network device, the network device may include a unit for implementing the method in the above second aspect or any of possible implementations thereof.

A fifth aspect provides a terminal device, where the terminal device may include a memory and a processor, the memory storing instructions, the processor is used for calling instructions stored in the memory to perform the method in the first aspect or any of optional implementations thereof.

A sixth aspect provides a network device, where the network device may include a memory and a processor, the memory storing instructions, the processor is used for calling instructions stored in the memory to perform the method in the second aspect or any of optional implementations thereof.

A seventh aspect provides a computer readable medium, where the computer readable medium stores program codes executed by a terminal device or a network device, the program codes include: instructions for performing the method in the first aspect or various implementations thereof, or instructions for performing the method in the second aspect or various implementations thereof.

An eighth aspect provides a system chip, where the system chip includes an input interface, an output interface, a processor, and a memory, the processor is configured to execute codes in the memory, when the codes are executed, the processor may implement the method in the foregoing first aspect and various implementations thereof, or perform method in the foregoing second aspect and various implementations thereof.

Therefore, in the embodiment of the present disclosure, after receiving the trigger signaling sent for triggering the CSI measurement by the network device, the terminal device performs the CSI measurement and the CSI feedback on the aperiodic CSI-RS resource, and the CSI measurement can be performed on demand without periodic real-time measurement, which can reduce the processing load of terminal device and network device, thereby improving communication performance, and determining a time domain resource for sending CSI to the network device based on a timing relationship between sending the first CSI and receiving the trigger signaling or performing the CSI measurement, which can enable the network device to determine the time domain resource for receiving the CSI in the same manner, so as to enable the network device to accurately obtain the CSI, and the using of the blind detection mode is not needed, thereby can further improve the communication performance.

BRIEF DESCRIPTION OF THE DRAWINGS

In order to more clearly illustrate the technical solutions of the embodiments of the present disclosure, the accompanying drawings needing to be used in the embodiments or the prior art description will be briefly introduced below. Obviously, the accompanying drawings in the following description are only some embodiments of the present disclosure, and those skilled in the art can also obtain other accompanying drawings according to these accompanying drawings on the premises of not paying inventive labor.

DETAILED DESCRIPTION OF THE EMBODIMENTS

The technical solutions in the embodiments of the present disclosure are described in the following with reference to the accompanying drawings in the embodiments of the present disclosure. Obviously, the described embodiments are part of the embodiments of the present disclosure, but not all of the embodiments. Based on the embodiments in the present disclosure, all other embodiments obtained by those skilled in the art on the premises of not paying creative efforts belong to the scope protected by the present disclosure.

The technical solution of the embodiments of the present disclosure can be applied to various communication systems, for example: Global System of Mobile communication (GSM) system, Code Division Multiple Access, (CDMA) system, Wideband Code Division Multiple Access (WCDMA) system, General Packet Radio Service (GPRS), Long Term Evolution, (LTE) system, LTE Frequency Division Duplex (FDD) system, LTE Time Division Duplex (TDD), Universal Mobile Telecommunication System (UMTS), Worldwide Interoperability for Microwave Access (WiMAX) communication systems or future 5G systems, etc.

Figure 1:
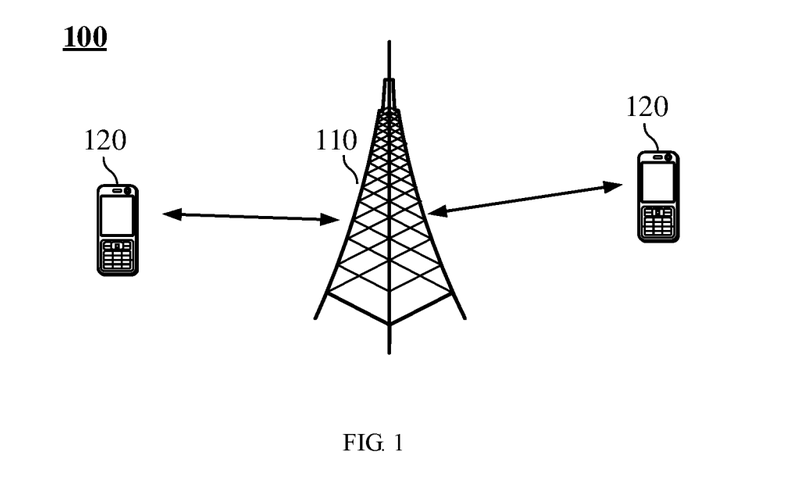
FIG. 1 is a schematic diagram of a wireless communication system according to an embodiment of the present disclosure.

FIG. 1 shows a wireless communication system 100 to which an embodiment of the present disclosure is applied. The wireless communication system 100 can include a network device 110. The network device 110 can be a device that communicates with the terminal device. The network device 110 can provide communication coverage for a specific geographic area and can communicate with a terminal device (for example, UE) located within the coverage area. In an embodiment, the network device 110 may be a base station (Base Transceiver Station, BTS) in a GSM system or a CDMA system, or may be a base station (NodeB, NB) in a WCDMA system, or may also be an evolved base station (Evolutional Node B, eNB or eNodeB) in LTE system, or a wireless controller in a Cloud Radio Access Network (CRAN), or the network device can be a relay station, an access point, an in-vehicle device, a wearable device, a network device in the future 5G network or a network device in the future evolved Public Land Mobile Network (PLMN), etc.

The wireless communication system 100 further includes at least one terminal device 120 located within the coverage of the network device 110. The terminal device 120 can be mobile or fixed. In an embodiment, terminal device 120 may refer to an access terminal, a user equipment (UE), user unit, user station, mobile station, mobile platform, remote station, remote terminal, mobile device, user terminal, terminal, wireless communication device, user agent or user apparatus. The access terminal can be a cellular phone, a cordless phone, a Session Initiation Protocol (SIP) phone, Wireless Local Loop (WLL) station, Personal Digital Assistant (PDA), handheld devices with wireless communication capabilities, computing devices or other processing devices connected to wireless modems, in-vehicle devices, wearable devices, terminal devices in future 5G network or terminal devices in future evolved PLMN, etc.

In an embodiment, a 5G system or network can also be called a new radio (New Radio, NR) system or network.

FIG. 1 exemplarily shows a network device and two terminal devices, optionally, the wireless communication system 100 may include multiple network devices and other numbers of terminal devices may be included within the range of the coverage of each network device, which is not limited in the embodiment of the present disclosure.

In an embodiment, the wireless communication system 100 can also include other network entities such as a network controller, a mobility management entity, and the like, which is not limited by the embodiment of the present disclosure.

It should be understood that the terms "system" and "network" herein are often used interchangeably herein. The term "and/or" herein is merely an association relationship that describes an association object, indicating that there can be three relationships, for example, A and/or B, can indicate the following three cases: A exists separately, A and B exist at the same time, B exists separately. In addition, the character "/" herein generally indicates that the contextual object is an "or" relationship.

Figure 2:
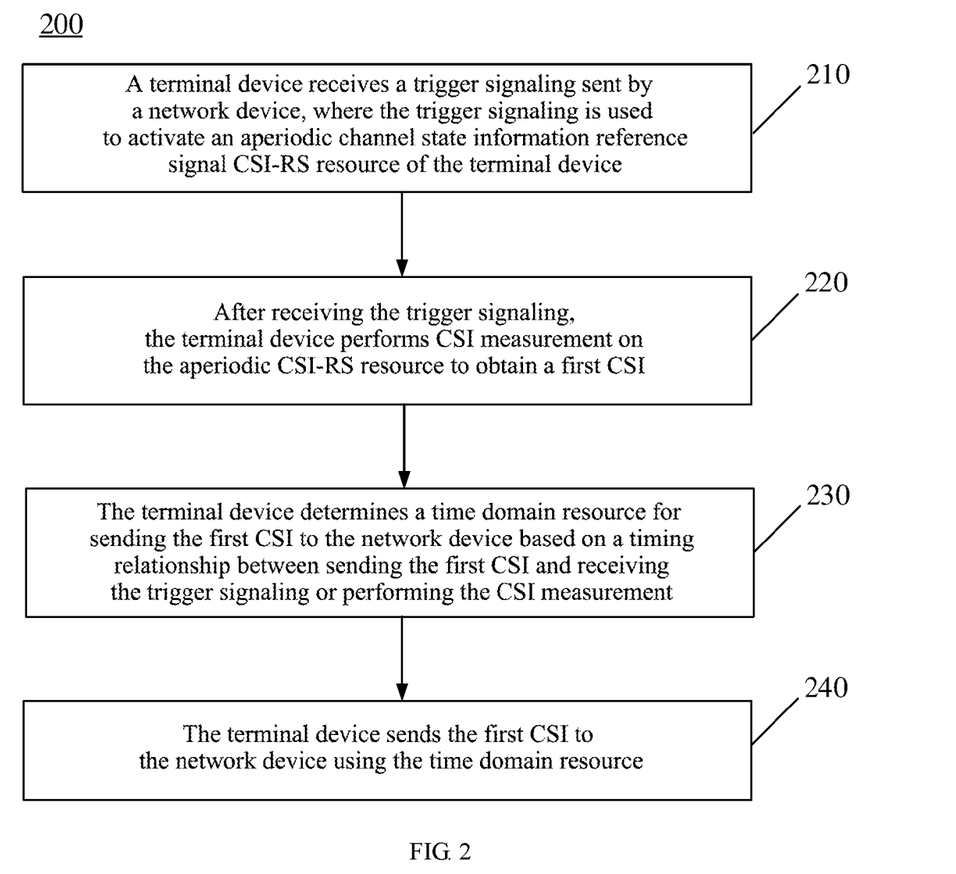
FIG. 2 is a schematic flow chart of a wireless communication method according to an embodiment of the present disclosure.

FIG. 2 is a schematic flow chart of a wireless communication method 200 according to an embodiment of the present disclosure, wherein the method 200 can optionally be used in the above wireless communication system 100.

As shown in FIG. 2, the method 200 includes the following.

In 210, a terminal device receives a trigger signaling sent by a network device, where the trigger signaling is used to activate an aperiodic channel state information reference signal CSI-RS resource of the terminal device.

In an embodiment, the trigger signaling may be Downlink Control Information (DCI) signaling or Media Access Control (MAC) signaling.

In 220, after receiving the trigger signaling, the terminal device performs CSI measurement on the aperiodic CSI-RS resource to obtain a first CSI.

In an embodiment the terminal device may determine the aperiodic CSI-RS resource used for obtaining the first CSI from the resource used for the aperiodic CSI-RS transmission.

Wherein, the resource for aperiodic CSI-RS transmission may refer to a resource for measurement based on aperiodic CSI-RS. The resource used for aperiodic CSI-RS transmission may be a periodic resource, but aperiodic CSI-RS transmission may be implemented on the resource, that is, the measurement based on aperiodic CSI-RS.

Wherein, the resource used for aperiodic CSI-RS transmission is usually a CSI-RS resource configured by a network device, and its configuration information may include time domain offset and period, etc., thereby the terminal device may determine the aperiodic CSI-RS resource used for obtaining the first CSI from the resource used for the aperiodic CSI-RS transmission according to the configuration information. The resource used for aperiodic CSI-RS transmission may be a resource shared by multiple terminals. In the resource, other resources other than the aperiodic CSI-RS resource for obtaining the first CSI may be used as the aperiodic CSI-RS resource of other terminals, and used by the network device to trigger other terminal devices to perform the CSI measurement based on the resources.

In an embodiment, the network device may indicate the resource for aperiodic CSI-RS transmission to the terminal device in advance through a high layer signaling or a DCI signaling.

For example, one CSI-RS resource may be indicated from multiple CSI-RS resources configured by a MAC layer message or an RRC message by using the DCI signaling as the resource for aperiodic CSI-RS transmission, the others may be used as resources for periodic CSI-RS transmission, or resources for persistent CSI-RS transmission.

Wherein, a resource configuration can correspond to one CSI-RS resource, that is, one CSI-RS resource of multiple CSI-RS resources are different from the resource configuration of other CSI-RS resources, for example, at least one of a time domain offset and a period can be different.

In an embodiment, the terminal device may determine the most recent resource in the resources for aperiodic CSI-RS transmission after receiving the trigger signaling as the aperiodic CSI-RS resource used for obtaining the first CSI.

Specifically, the terminal device may perform measurement based on the CSI-RS signal that can be received earliest on a resource used for aperiodic CSI-RS transmission after receiving the trigger signaling.

Or, after receiving the trigger signaling, the terminal device determines respectively the most recent resource on the plurality of resources for aperiodic CSI-RS transmission as the aperiodic CSI-RS resource used for obtaining the first CSI.

Or, after receiving the trigger signaling, the terminal device determines the most recent multiple resources in resource used for aperiodic CSI-RS transmission as the aperiodic CSI-RS resource used for obtaining the first CSI.

In an embodiment, if the aperiodic CSI-RS resource used for obtaining the first CSI includes multiple CSI-RS resources, the terminal device may assume that the CSI-RS signals transmitted on the multiple resources use the same beam, or use different beams. Or, if the aperiodic CSI-RS resource used for obtaining the first CSI includes only one CSI-RS resource, the terminal device may assume that different ports of the CSI-RS signal transmitted on the resource use the same beam, or use different beams. If the terminal device assumes that different beams are used, the CSI-RS resource indicator (CRI) needs to be included in the first CSI.

In an embodiment, the first CSI includes at least one of the following contents: a CSI-RS resource indicator (CRI), a Rank Indication (RI), a Pre-coding Matrix Indicator (PMI), a Channel Quality information (CQI), a quantized value of channel information and a quantized value of interference.

In an embodiment, the quantized value of the channel information may be a quantized value of a channel covariance matrix, or may be a quantized value of a channel eigenvector, or may be a quantized value of the channel estimator itself.

In an embodiment, the quantized value of the interference may be the interference covariance matrix or the quantized value of the interference power.

In an embodiment, the trigger signaling may include first information, where the first information is used to indicate content included in the first CSI; thereby the terminal device performs the CSI measurement on the first CSI-RS resource according to the first information to obtain the first CSI, wherein the first CSI includes the content indicated in the first information.

Wherein, the first information is used to indicate one of following contents:
  a CRI; or
  a RI, a PMI and a CQI; or
  a CRI, a RI, a PMI and a CQI; or
  a RI and a CQI; or
  a CRI, a RI and a CQI.

Wherein, the trigger signaling may indicate the content that the first CSI needs to include by the value of the bit included in the first information, for example, the first information may be 1 bit, and the value of the bit may indicate one of two CSI contents {CRI, RI/PMI/CQI}, for example, when the value of the bit is 0, it indicating that the first CSI needs to include CRI, and the value of this bit is 1, indicating that the first CSI needs to include RI, PMI and CQI.

Or, the value of 1 bit can indicate one of the following two contents {CRI, RI/PMI/CQI/CRI}, or, the value of 1 bit can indicate one of the following two contents {CRI, RI/CQI}.

In an embodiment, the terminal device determines at least one of the following according to the content included in the first CSI, and performs the CSI measurement according to at least one of the following to obtain the first CSI:
  the number and/or configuration of the aperiodic CSI-RS resource used for obtaining the first CSI, the number of CSI-RS ports used for performing CSI-RS measurement, and the hypothesis of the transmit beam for obtaining the CSI-RS signal on the aperiodic CSI-RS resource of the first CSI.

Wherein, the configuration of the aperiodic CSI-RS resource may include resource time domain offset, period, power, port number, and the like.

For example, if the first CSI has only CRI, the terminal device needs to perform CSI measurement based on multiple CSI-RS resources; if the first CSI content includes RI and CQI, or contains RI, PMI and CQI, the terminal device only needs to perform CSI measurement based on one CSI-RS resource.

For example, if the first CSI has only CRI, the terminal device needs to perform CSI measurement based on the first 1 or 2 CSI-RS ports (port 0 or 0, 1) on the aperiodic CSI-RS resource for obtaining the first CSI; if the first CSI includes RI and CQI, or includes RI, PMI, and CQI, the terminal device needs to perform CSI measurement based on all CSI-RS ports on the aperiodic CSI-RS resource used for obtaining the first CSI.

For example, if there is only CRI in the first CSI content, the terminal device assumes that different CSI-RS ports on the CSI-RS resource that the measurement is based on use different transmission beams, thereby performing CSI measurement; if the first CSI content includes RI and CQI, or includes RI, PMI, and CQI, the terminal assumes that different CSI-RS ports on the CSI-RS resource that the measurement is based on use the same transmit beam.

In an embodiment, after receiving the trigger signaling, the terminal device determines a first interfere measurement resource (Interfere Measurement Resource, IMR); performing interference measurement on the first IMR resource to obtain an interference result; in combination with the interference result, and the result obtained by performing the CSI measurement, obtaining the first CSI.

In an embodiment, the terminal device determines the first IMR resource from the IMR resource used for aperiodic interference measurement.

Wherein, IMR resource used for aperiodic interference measurement can be resource periodically occurred, the configuration information of the resources may include time domain offset and period, etc., thereby the terminal device may determine the first IMR resource from the IMR resource used for the aperiodic interference measurement according to the configuration information.

In an embodiment, the network device may indicate the IMR resource used for aperiodic interference measurement to the terminal device in advance through a high layer signaling or a DCI signaling. The IMR resource is generally configured by means of ZP (Zero Power) CSI-RS resource.

For example, one resource may be indicated from multiple IMR resources configured by a MAC layer message or RRC message by DCI signaling as an IMR resource used for aperiodic interference measurement, the others can serve as IMR resource used for periodic interference measurements, or IMR resources for persistent interference measurements. Wherein, an IMR resource can be a ZP CSI-RS resource.

Wherein, a resource configuration may correspond to one IMR resource, that is, one of the plurality of IMR resources are different from the resource configuration of the other IMR resources, for example, may be different for at least one of a time domain offset and a period.

In an embodiment, the terminal device may determine, in the IMR resource used for the aperiodic interference measurement, the most recent resource in the time domain after receiving the trigger signaling as the first IMR resource.

Specifically, the terminal device can perform interference measurement based on the most recent resource in the IMR resource used for aperiodic interference measurement.

Or, after receiving the trigger signaling, the terminal device may respectively determine each the most recent resource in the multiple IMR resources used for aperiodic interference measurement as the first IMR resource.

Or, after receiving the trigger signaling, the terminal device may use the most recent multiple resources in the IMR resource used for the aperiodic interference measurement as the first IMR resource.

In 230, the terminal device determines a time domain resource for sending the first CSI to the network device based on a timing relationship between sending the first CSI and receiving the trigger signaling or performing the CSI measurement.

In an embodiment, the timing relationship mentioned in the embodiment of the present disclosure generally refers to a time domain transmission unit that differentiated between different events, for example, the number of slot or subframe. For example, it may be the timing relationship between the sending the first CSI and the receiving trigger signaling, or may be the timing relationship between sending the first CSI and performing CSI measurement.

In an embodiment, the terminal device may determine the timing relationship according to the content included in the first CSI.

In an embodiment, the terminal device may select the timing relationship used for the feedback of the first CSI at this time from the multiple timing relationships according to the content included in the first CSI.

Specifically, since different CSI contents require different lengths of terminal device processing time, corresponding feedback delays are also different, and different timing relationships are required.

For example, if only the CRI is included in the first CSI, a shorter feedback delay may be used, for example, the difference between the reception of the trigger signaling and the CSI feedback is 1 slot.

For example, if the first CSI includes RI, PMI, and CQI, or includes RI and CQI, a longer feedback delay may be used, for example, the difference between the reception of the trigger signaling and the CSI feedback is 2 slots;

For example, if the first CSI includes a channel covariance matrix, or an interference covariance matrix, a longer feedback delay is required, for example, a difference between the reception of the trigger signaling and the CSI feedback is 3 slots.

In an embodiment, the plurality of timing relationships may be sent by the network device to the terminal device, for example, it can be carried in trigger signaling, that is, the terminal device may determine multiple timing relationships from the configuration information of the timing relationship of the trigger signaling, wherein, in the configuration information of the timing relationship, the CSI content applicable to each timing relationship may be indicated.

In an embodiment, the multiple timing relationships may be indicated by the same indication domain, that is, for different CSI content, the timing relationship indicated by the same indication domain is different.

For example, as shown in Table 1 below, the timing relationship indication domain may include two 2-bits, if assuming that the value of the bit in the indication domain is 01, it indicates that when the first CSI only includes CRI, the feedback delay N (that is, the number of time domain resource unit differentiating by reception of the trigger signaling and the CSI reporting) is 1, and when the first CSI includes RI, PMI and CQI, the feedback delay N is 2.

TABLE 1

| Timing relationship indication domain | The first CSI only contains CRI | The first CSI includes RI/PMI/CQI |
| --- | --- | --- |
| 00 | N = 0 | N = 0 |
| 01 | N = 1 | N = 2 |
| 10 | N = 2 | N = 4 |
| 11 | — | — |

Of course, in the embodiment of the present disclosure, the configuration information of the timing relationship carried in the trigger signaling may also indicate only one timing relationship, that is, the timing relationship is applicable to the CSI including any contents.

In an embodiment, for a specific CSI content, the network device may pre-configure multiple timing relationships through the high-level signaling, and then indicate one of the timing relationships by trigger signaling.

Of course, the multiple timing relationships pre-configured by the network device through the high-layer signaling may also not be specific to the specific content, that is, all CSI contents are applicable, and the timing relationship indicated by the trigger signaling can also be applied to all CSI contents.

In 240, the terminal device sends the first CSI to the network device using the time domain resource.

In an embodiment, the terminal device can send the first CSI to the network device multiple times.

In an embodiment, the trigger signaling includes third information, where the third information is used to indicate the number of times that the terminal device sends the first CSI; the terminal device sends the CSI according to the number of transmission indicated by the third information.

In an embodiment, when the first CSI is sent multiple times, the measurement configuration information corresponding to the first CSI sent each time is different from that corresponding to the first CSI sent by other times.

In an embodiment, the measurement configuration information may include configuration information of the measured resource, including any one of time domain resource information, spatial domain resource information, frequency domain resource information, and code domain resource information.

Wherein, the time domain resource information may include periods and offsets of time domain resources, etc. The spatial domain resource may include a transmit beam of the CSI-RS.

Figure 3:
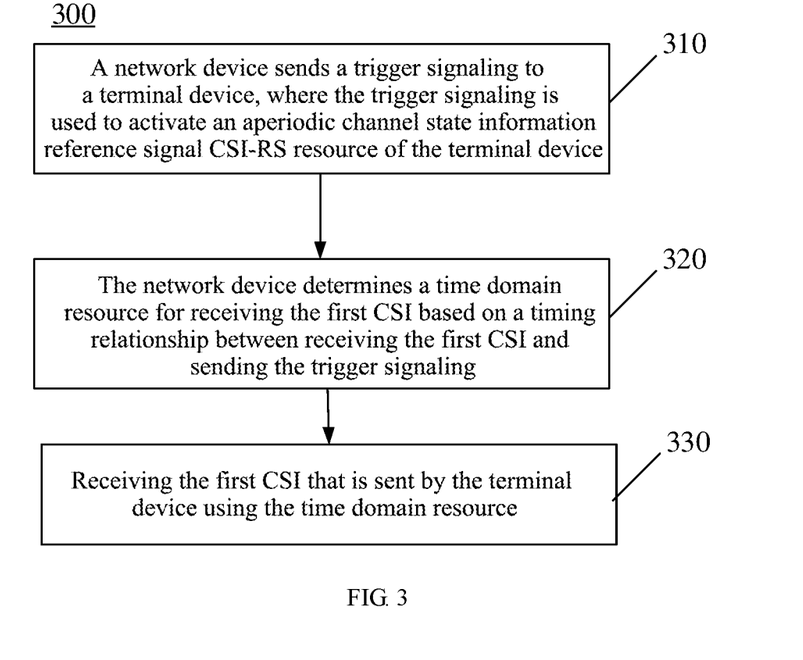
FIG. 3 is a schematic flow chart of a wireless communication method according to an embodiment of the present disclosure.

FIG. 3 is a schematic flowchart of a wireless communication method 300 according to an embodiment of the present disclosure. As shown in FIG. 3, the method 300 includes the following.

In 310, a network device sends a trigger signaling to a terminal device, where the trigger signaling is used to activate an aperiodic channel state information reference signal CSI-RS resource of the terminal device.

In 320, the network device determines a time domain resource for receiving the first CSI based on a timing relationship between receiving the first CSI and sending the trigger signaling.

Of course, in the embodiment of the present disclosure, the network device may also be based on a timing relationship between receiving the first CSI and the terminal device performing CSI measurement, so that the network device determines to the time domain resource for receiving the first CSI. Wherein, the network device may be based on a resource that the terminal device can be used for aperiodic CSI-RS transmission, and a time domain resource for sending the trigger signaling, so as to estimate a time for the terminal device to perform CSI measurement.

In 330, receiving the first CSI that is sent by the terminal device using the time domain resource.

In an embodiment, the first CSI includes at least one of the following contents: a CRI, a RI, a PMI, a CQI, a quantized value of channel information and a quantized value of interference.

In an embodiment, when the first CSI includes CRI, obtaining beam information of downlink beamforming used for downlink scheduling according to the CRI.

Specifically, downlink scheduling may include downlink pre-coding, and the network device can perform downlink pre-coding by using the beam information of the downlink beamforming.

In an embodiment, when the first CSI includes the RI, the PMI, and the CQI, performing the downlink data scheduling on the terminal device according to the RI, the PMI, and the CQI.

In an embodiment, when the first CSI includes the rank indication RI and the channel quality indication CQI, performing downlink data scheduling on the terminal device according to the RI and the CQI. In an embodiment, the trigger signaling includes at least one of first information, second information, and third information, wherein, the first information is used to indicate content included in the first CSI;

the second information is configuration information of the timing relationship, and is used by the terminal device to determine the timing relationship according to the configuration information of the timing relationship;

the third information is used to indicate the number of times that the terminal device sends the first CSI.

It should be understood that the network device in the method 300 can implement the corresponding functions implemented by the terminal device mentioned in the method 200, and for brevity, no further description is provided herein.

Therefore, in the embodiment of the present disclosure, after receiving the trigger signaling sent for triggering the CSI measurement by the network device, the terminal device performs the CSI measurement and the CSI feedback on the aperiodic CSI-RS resource, and the CSI measurement can be performed on demand without periodic real-time measurement, which can reduce the processing load of terminal device and network device, thereby improving communication performance, and determining a time domain resource for sending CSI to the network device based on a timing relationship between sending the first CSI and receiving the trigger signaling or performing the CSI measurement, which can enable the network device to determine the time domain resource for receiving the CSI in the same manner, so as to enable the network device to accurately obtain the CSI, and the using of the blind detection mode is not needed, thereby can further improve the communication performance.

Figure 4:
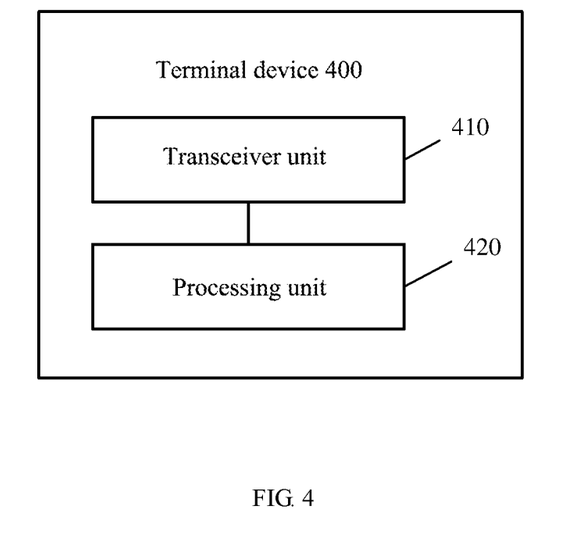
FIG. 4 is a schematic block diagram of a terminal device according to an embodiment of the present disclosure.

FIG. 4 is a schematic block diagram of a terminal device 400 according to an embodiment of the present disclosure. As shown in FIG. 4, the terminal device 400 includes a transceiver unit 410 and a processing unit 420.

The transceiver unit 410 is configured to: receive trigger signaling sent by a network device, where the trigger signaling is used to activate an aperiodic channel state information reference signal CSI-RS resource of the terminal device;

the processing unit 420 is configured to: perform CSI measurement on the aperiodic channel state information reference signal CSI-RS resource to obtain a first CSI after the transceiver unit receives the trigger signaling;

the processing unit 420 is further configured to: determine a time domain resource for sending the first CSI to the network device based on a timing relationship between sending the first CSI and receiving the trigger signaling or performing the CSI measurement;

the transceiver unit 410 is further configured to: send the first CSI to the network device using the time domain resource.

In an embodiment, the first CSI includes at least one of the following contents:

a CSI-RS resource indicator CRI, a rank indication RI, a pre-coding matrix indicator PMI, a channel quality information CQI, a quantized value of channel information and a quantized value of interference.

In an embodiment, the processing unit 420 is further configured to:

according to the content included in the first CSI, determine at least one of following, and perform the CSI measurement according to at least one of the following to obtain the first CSI:

aperiodic CSI-RS resource, number of CSI-RS ports used for performing CSI-RS measurement, and hypothesis of the transmit beam of the CSI-RS signal on the aperiodic CSI-RS resource.

In an embodiment, the processing unit 420 is further configured to: before determining a time domain resource for sending the first CSI to the network device based on a timing relationship between sending the first CSI and receiving the trigger signaling or performing the CSI measurement, determine the timing relationship according to the content included in the first CSI.

In an embodiment, the trigger signaling includes first information, where the first information is used to indicate content included in the first CSI;

the processing unit 420 is further configured to:

perform the CSI measurement on the first CSI-RS resource according to the first information to obtain the first CSI, where the first CSI includes the content indicated in the first information.

In an embodiment, the first information is used to indicate one of following contents:

a CRI; or a RI, a PMI and a CQI; or a CRI, a RI, a PMI and a CQI; or a RI and a CQI; or a CRI, a RI and a CQI.

In an embodiment, the trigger signaling includes second information, where the second information is configuration information of a timing relationship;

the processing unit 420 is further configured to: before determining a time domain resource for sending the first CSI to the network device based on a timing relationship between sending the first CSI and receiving the trigger signaling or performing the CSI measurement, determine the timing relationship between sending the first CSI and receiving the trigger signaling or performing the CSI measurement according to the configuration information of the timing relationship.

In an embodiment, the transceiver unit 410 is further configured to:

send the first CSI to the network device multiple times.

In an embodiment, the trigger signaling includes third information, where the third information is used to indicate the number of times that the terminal device sends the first CSI;

the transceiver unit 410 is further configured to: send the CSI according to the number of transmission indicated by the third information.

In an embodiment, when sending multiple times, the measurement configuration information corresponding to the first CSI sent each time is different from that corresponding to the first CSI sent by other times.

In an embodiment, the processing unit 420 is further configured to: before performing CSI measurement on the aperiodic CSI-RS resource to obtain a first CSI, determine the most recent resource on the time domain after receiving the trigger signaling as the aperiodic CSI-RS resource from a resource used for aperiodic CSI-RS transmission.

In an embodiment, the processing unit 420 is further configured to:

after receiving the trigger signaling, determine a first interference measurement resource IMR;

perform interference measurement on the first IMR resource to obtain an interference result;

obtain the first CSI by combining the interference result and the result obtained by performing the CSI measurement.

In an embodiment, the processing unit 420 is further configured to:

determine the most recent resource on the time domain after receiving the trigger signaling as the first IMR resource from an IMR resource used for the aperiodic interference measurement.

In an embodiment, the trigger signaling is downlink control information DCI signaling or media access control MAC signaling.

It should be understood that the terminal device 400 may correspond to the terminal device in the method 200, and the corresponding function of the terminal device may be implemented, for brevity, no further description is provided herein.

Figure 5:
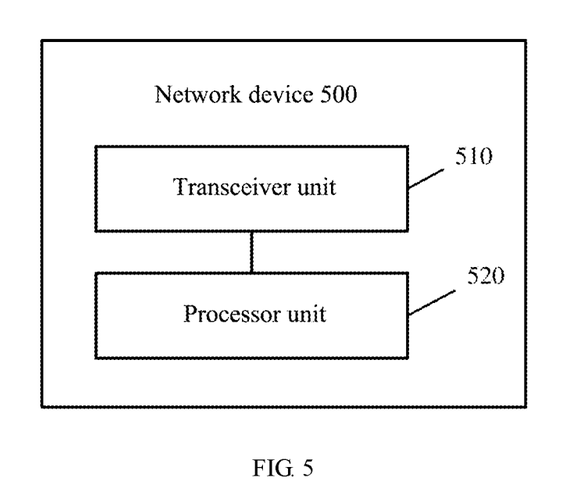
FIG. 5 is a schematic block diagram of a network device according to an embodiment of the present disclosure.

FIG. 5 is a schematic block diagram of a network device 500 according to an embodiment of the present disclosure. As shown in FIG. 5, the network device 500 includes a transceiver unit 510 and a processing unit 520;

the transceiver unit 510 is configured to: send a trigger signaling to a terminal device, where the trigger signaling is used to activate an aperiodic channel state information reference signal CSI-RS resource of the terminal device;

the processing unit 520 is configured to: determine a time domain resource for receiving the first CSI based on a timing relationship between receiving the first CSI and sending the trigger signaling;

the transceiver unit 510 is further configured to: receive the first CSI that is sent by the terminal device using the time domain resource.

In an embodiment, the first CSI includes at least one of following contents:

a CSI-RS resource indicator CRI, a rank indication RI, a pre-coding matrix indicator PMI, a channel quality indication CQI, a quantized value of channel information and a quantized value of interference.

In an embodiment, the processing unit is further configured to:

when the first CSI includes CRI, obtain beam information of downlink beamforming used for downlink scheduling according to the CRI; or, when the first CSI includes the RI, the PMI and the CQI, perform downlink data scheduling on the terminal device according to the RI, the PMI, and the CQI, or when the first CSI includes the rank indication RI and the channel quality indication CQI, perform downlink data scheduling on the terminal device according to the RI and the CQI.

In an embodiment, the trigger signaling includes at least one of first information, second information, and third information, wherein, the first information is used to indicate content included in the first CSI;

the second information is configuration information of a timing relationship, and is used by the terminal device to determine the timing relationship according to the configuration information of the timing relationship;

the third information is used to indicate the number of times that the terminal device sends the first CSI.

It should be understood that the network device 500 may correspond to the network device in the method 300, and the corresponding function of the network device may be implemented, for brevity, no further description is provided herein.

Figure 6:
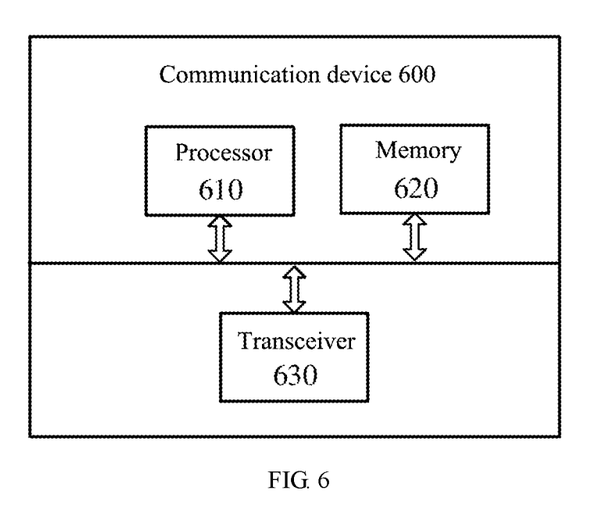
FIG. 6 is a schematic block diagram of a communication device according to an embodiment of the present disclosure.

FIG. 6 is a schematic block diagram of a communication device 600 according to an embodiment of the present disclosure. As shown in FIG. 6, the communication device 600 includes a processor 610 and a memory 620. Wherein, the memory 620 may store program codes, and the processor 610 may execute the program codes stored in the memory 620.

In an embodiment, as shown in FIG. 6, the communication device 600 may include a transceiver 630, and the processor 610 may control the transceiver 630 to communicate externally.

In an embodiment, the processor 610 may call the program codes stored in the memory 620 to perform corresponding operations of the terminal device in the method 200 shown in FIG. 2, for brevity, no further description is provided herein.

In an embodiment, the processor 610 may call the program codes stored in the memory 620 to perform the corresponding operations of the network device in the method 300 shown in FIG. 3, for brevity, no further description is provided herein.

Figure 7:
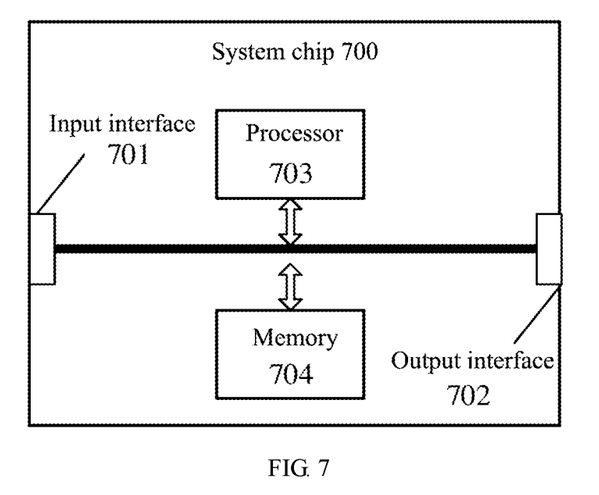
FIG. 7 is a schematic block diagram of a system chip according to an embodiment of the present disclosure.

FIG. 7 is a schematic structural diagram of a system chip 700 according to an embodiment of the present disclosure. The system chip 700 of FIG. 7 includes an input interface 701, an output interface 702, and the processor 703 and the memory 704 are connected by a communication connection, and the processor 703 is configured to execute the codes in the memory 704.

In an embodiment, when the codes are executed, the processor 703 implements the method executed by the terminal device in the method 200 shown in FIG. 2. For brevity, no further description is provided herein.

In an embodiment, when the codes are executed, the processor 703 implements the method executed by the network device in the method 300 shown in FIG. 3. For brevity, no further description is provided herein.

Those of ordinary skill in the art will appreciate that the elements and algorithm steps of the various examples described in connection with the embodiments disclosed herein can be implemented in a combination of electronic hardware, or computer software, and electronic hardware. Whether these functions are implemented in hardware or software depends on the specific disclosure and design constraints of the technical solutions. A skilled person can use different methods to implement the described functionality for each particular disclosure, but such implementation should not be considered to go beyond the scope of the present disclosure.

A person skilled in the art can clearly understand that, for the convenience and brevity of the description, the specific working process of the system, the apparatus and the unit described above may refer to the corresponding process in the foregoing method embodiment, and details are not described herein again.

In the several embodiments provided by the present disclosure, it should be understood that the disclosed system, apparatus, and method may be implemented in other manners. For example, the apparatus embodiments described above are merely illustrative, for example, the division of the unit is only a logical function division, and the actual implementation may have another division manner, For example, multiple units or components can be combined or can be integrated into another system, or some features can be ignored, or not be executed. In addition, the mutual coupling or direct coupling or communication connection shown or discussed may be an indirect coupling or communication connection through some interface, apparatus or unit, and may be electrical, mechanical or other form.

The unit described as a separate component may or may not be physically separated, the component displayed as a unit may be or may not be a physical unit, that is, may be located in one place, or may be distributed to multiple network units. The part or all of the units may be selected according to actual needs to achieve the purpose of the solution of the present embodiment.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure is essentially, or the part that contributes to the prior art, or the part of the technical solution can be embodied in the form of a software product, the computer software product is stored in a storage medium and includes several instructions for causing a computer device (which may be a personal computer, server, or network device, etc.) to perform all or part of the steps of the methods described in various embodiments of the present disclosure. The foregoing storage medium includes: a U disk, a mobile hard disk, a read-only memory (ROM), a random access memory (RAM), a disk or an optical disk and various medias that can store program code.

The above description is only a specific embodiment of the present disclosure, but the scope protected by the present disclosure is not limited thereto. Changes or substitutions that can be easily considered by any person skilled in the art within the technical scope disclosed in the present disclosure should be covered within the scope protected by the present disclosure. Therefore, the scope protected by the present disclosure shall be subject to the scope protected by the claims.

What is claimed is:

1. A wireless communication method, comprising:
receiving, by a terminal device, a trigger signaling sent by a network device, wherein the trigger signaling is used to activate an aperiodic channel state information reference signal (CSI-RS) resource of the terminal device, and wherein the triggering signaling comprises first information, where the first information is used to indicate content comprised in a first CSI;
after receiving the trigger signaling, performing, by the terminal device, CSI measurement on the aperiodic CSI-RS resource to obtain a first CSI;
determining, by the terminal device, a time domain resource for sending the first CSI to the network device based on multiple timing relationships between sending the first CSI and receiving the trigger signaling; and
sending, by the terminal device, the first CSI to the network device using the time domain resource;
wherein the performing, by the terminal device, CSI measurement on the aperiodic CSI-RS resource comprises:
performing, by the terminal device, the CSI measurement on a first CSI-RS resource according to the first information to obtain the first CSI, wherein the first CSI comprises the content indicated in the first information;
wherein the first information is used to indicate one of following CSI contents:
a CSI-RS resource indicator (CRI); or
a CRI, a rank indication (RI), a pre-coding matrix indicator (PMI) and a channel quality information (CQI); or
a RI and a CQI; or
a CRI, a RI and a CQI;
wherein each of the CSI contents corresponds to a feedback delay, and the multiple timing relationships are represented by multiple feedback delays;
wherein the multiple feedback delays are indicated by a timing relationship indication domain comprised in the triggering signaling;
wherein the timing relationship indication domain comprises 2-bits, and
the 2-bits are used to indicate whether there is a feedback delay between sending the first CSI and receiving the trigger signaling or not, and when the 2-bits are 00, there is not a feedback delay between sending the first CSI and receiving the trigger signaling.

2. The method according to claim 1, wherein the first CSI further includes following contents:
a quantized value of channel information and a quantized value of interference.

3. The method according to claim 1, wherein before the determining, by the terminal device, a time domain resource for sending the first CSI to the network device based on the multiple timing relationships between sending the first CSI and receiving the trigger signaling, the method also comprises:
determining the multiple timing relationships according to at least one content comprised in the first CSI.

4. The method according to claim 1, wherein the trigger signaling comprises second information, where the second information is configuration information of the multiple timing relationships;
before the determining, by the terminal device, a time domain resource for sending the first CSI to the network device based on the multiple timing relationships between sending the first CSI and receiving the trigger signaling, the method also comprises:
determining the multiple timing relationships between sending the first CSI and receiving the trigger signaling according to the configuration information of the multiple timing relationships, wherein the configuration information of the multiple timing relationships comprises the first indication field.

5. The method according to claim 1, wherein the triggering signaling comprises third information, the third information is used to indicate the number of times that the terminal device sends the first CSI;
the sending, by the terminal device, the first CSI to the network device comprises: sending, by the terminal device, the first CSI according to the number of transmission indicated by the third information.

6. The method according to claim 1, wherein the method also comprises:
after receiving the trigger signaling, determining a first interference measurement resource (IMR);
performing interference measurement on the first IMR resource to obtain an interference result;
obtaining the first CSI by combining the interference result and the result obtained by performing the CSI measurement.

7. The method according to claim 1, wherein the performing, by the terminal device, CSI measurement on the aperiodic CSI-RS resource to obtain a first CSI comprises:
determining, by the terminal device, at least one of following according to the content comprised in the first CSI, and performing, by the terminal device, the CSI measurement according to at least one of the following to obtain the first CSI:
resource and/or configuration of the aperiodic CSI-RS resource, number of CSI-RS ports used for performing CSI-RS measurement, and hypothesis of the transmit beam of the CSI-RS signal on the aperiodic CSI-RS resource.

8. The method according to claim 1, wherein
if the first CSI comprises the CRI only, a feedback delay between the sending the first CSI and receiving the trigger signaling is 1 slot; or
if the first CSI comprises the RI and the CQI, the feedback delay between the sending the first CSI and receiving the trigger signaling is 2 slots; or
if the first CSI comprises a quantized value of channel information and a quantized value of interference, the feedback delay between the sending the first CSI and receiving the trigger signaling is 3 slots.

9. The method according to claim 1, wherein the more item the CSI content has, the longer the feedback delay is.

10. A terminal device, comprising a transceiver and a processor: wherein
the transceiver is configured to: receive trigger signaling sent by a network device, wherein the trigger signaling is used to trigger the terminal device to perform channel state information CSI measurement, and the triggering signaling comprises first information, where the first information is used to indicate content comprised in a first CSI;
the processor is configured to: perform CSI measurement on the aperiodic channel state information reference signal CSI-RS resource to obtain a first CSI after the transceiver receives the trigger signaling,
the processor is further configured to: determine a time domain resource for sending the first CSI to the network device based on multiple timing relationships between sending the first CSI and receiving the trigger signaling;
the transceiver is further configured to: send the first CSI to the network device using the time domain resource;
wherein the processor is further configured to:
perform the CSI measurement on a first CSI-RS resource according to the first information to obtain the first CSI, wherein the first CSI comprises the content indicated in the first information;
wherein the first information is used to indicate one of following CSI contents:
a CSI-RS resource indicator (CRI); or
a CRI, a rank indication (RI), a pre-coding matrix indicator (PMI) and a channel quality information (CQI); or
a RI and a CQI; or
a CRI, a RI and a CQI;
wherein each of the CSI contents corresponds to a feedback delay, and the multiple timing relationships are represented by multiple feedback delays;
wherein the multiple feedback delays are indicated by a timing relationship indication domain comprised in the triggering signaling;
wherein the timing relationship indication domain comprises 2-bits, and the 2-bits are used to indicate whether there is a feedback delay between sending the first CSI and receiving the trigger signaling or not, and when the 2-bits are 00, there is not a feedback delay between sending the first CSI and receiving the trigger signaling.

11. The terminal device according to claim 10, wherein the first CSI further comprises at least one of following contents:
a quantized value of channel information and a quantized value of interference.

12. The terminal device according to claim 10, wherein the processor is further configured to: before the determining a time domain resource for sending the first CSI to the network device based on the multiple timing relationships between sending the first CSI and receiving the trigger signaling, determine the multiple timing relationships according to content comprised in the first CSI.

13. The terminal device according to claim 10, wherein the trigger signaling comprises second information, where the second information is configuration information of the multiple timing relationships;
the processor is further configured to: before the determining a time domain resource for sending the first CSI to the network device based on the multiple timing relationships between sending the first CSI and receiving the trigger signaling, determine the multiple timing relationships between sending the first CSI and receiving the trigger signaling according to the configuration information of the multiple timing relationships, wherein the configuration information of the multiple timing relationships comprises the first indication field.

14. The terminal device according to claim 10, wherein the trigger signaling comprises third information, the third information is used to indicate the number of times that the first CSI is sent;
the transceiver is further configured to: send the first CSI according to the number of transmission indicated by the third information.

15. The terminal device according to claim 10, wherein the processor is further configured to:
after receiving the trigger signaling, determine a first interference measurement resource (IMR);
perform interference measurement on the first IMR resource to obtain an interference result;
obtain the first CSI by combining the interference result and the result obtained by performing the CSI measurement.

16. The terminal device according to claim 15, wherein the processor is further configured to:
determine the most recent resource after receiving the trigger signaling as the first IMR resource from IMR resources used for the aperiodic interference measurement.

17. The terminal device according to claim 10, wherein the processor is further configured to:
determine at least one of following according to the content comprised in the first CSI, and perform the CSI measurement according to at least one of the following to obtain the first CSI:
resource and/or configuration of the aperiodic CSI-RS resource, number of CSI-RS ports used for performing CSI-RS measurement, and hypothesis of the transmit beam of the CSI-RS signal on the aperiodic CSI-RS resource.

18. The terminal device according to claim 10, wherein
if the first CSI comprises the CRI only, a feedback delay between the sending the first CSI and receiving the trigger signaling is 1 slot; or
if the first CSI comprises the RI and the CQI, the feedback delay between the sending the first CSI and receiving the trigger signaling is 2 slots; or
if the first CSI comprises a quantized value of channel information and a quantized value of interference, the feedback delay between the sending the first CSI and receiving the trigger signaling is 3 slots.

19. A network device, comprising a transceiver and a processor wherein the transceiver is configured to send trigger signaling to a terminal device, wherein the trigger signaling is used to trigger the terminal device to perform channel state information CSI measurement, and the triggering signaling comprises first information, where the first information is used to indicate one of following CSI contents:
a CSI-RS resource indicator (CRI); or
a CRI, a rank indication (RI), a pre-coding matrix indicator (PMI) and a channel quality information (CQI); or
a RI and a CQI; or
a CRI, a RI and a CQI;
wherein each of the CSI contents corresponds to a feedback delay, and multiple timing relationships are represented by multiple feedback delays;
wherein the multiple feedback delays are indicated by a timing relationship indication domain comprised in the triggering signaling;
wherein the timing relationship indication domain comprises 2-bits, and
the 2-bits are used to indicate whether there is a feedback delay between sending the first CSI and receiving the trigger signaling or not, and when the 2-bits are 00, there is not a feedback delay between sending the first CSI and receiving the trigger signaling;
receiving the first CSI triggered by the trigger signaling.

* * * * *